US008050184B2

(12) United States Patent
Park et al.

(10) Patent No.: US 8,050,184 B2
(45) Date of Patent: Nov. 1, 2011

(54) SYSTEMS AND METHODS FOR NETWORK CHANNEL ALLOCATION

(75) Inventors: Daniel J. Park, Beaverton, OR (US); Deepak Ayyagari, Vancouver, WA (US); George M. Peponides, Encinitas, CA (US); James E. Petranovich, San Diego, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1743 days.

(21) Appl. No.: 11/089,623

(22) Filed: Mar. 23, 2005

(65) Prior Publication Data
US 2005/0169192 A1 Aug. 4, 2005

Related U.S. Application Data

(63) Continuation of application No. PCT/US2004/036969, filed on Nov. 5, 2004.

(60) Provisional application No. 60/573,353, filed on May 21, 2004, provisional application No. 60/537,492, filed on Jan. 19, 2004, provisional application No. 60/518,036, filed on Nov. 7, 2003, provisional application No. 60/518,224, filed on Nov. 7, 2003, provisional application No. 60/518,237, filed on Nov. 7, 2003, provisional application No. 60/518,574, filed on Nov. 7, 2003.

(51) Int. Cl.
*H01R 31/08* (2006.01)
(52) U.S. Cl. ........................................ 370/252; 370/329
(58) Field of Classification Search .................. 370/252, 370/329
See application file for complete search history.

(56) References Cited

U.S. PATENT DOCUMENTS

| 4,313,212 | A | * | 1/1982 | Whitlock ................. 455/146 |
| 5,402,413 | A | | 3/1995 | Dixon |
| 5,495,483 | A | | 2/1996 | Grube et al. |
| 5,541,955 | A | | 7/1996 | Jacobsmeyer |
| 5,596,439 | A | | 1/1997 | Dankberg et al. |
| 5,644,673 | A | | 7/1997 | Bingham et al. |
| 5,828,963 | A | | 10/1998 | Grandhi et al. |
| 5,949,769 | A | * | 9/1999 | Davidson et al. .......... 370/329 |
| 6,006,271 | A | | 12/1999 | Grabiec et al. |
| 6,038,455 | A | | 3/2000 | Gardner et al. |
| 6,084,886 | A | | 7/2000 | Dehner et al. |
| 6,097,700 | A | | 8/2000 | Thornberg et al. |
| 6,167,095 | A | | 12/2000 | Furukawa et al. |
| 6,226,692 | B1 | * | 5/2001 | Miloushev et al. ........ 719/316 |
| 6,233,240 | B1 | | 5/2001 | Barbas et al. |
| 6,278,723 | B1 | | 8/2001 | Meihofer et al. |

(Continued)

FOREIGN PATENT DOCUMENTS

JP 05-304530 11/1993

(Continued)

OTHER PUBLICATIONS

International Application No. PCT/US04/036797 International Search Report.

(Continued)

*Primary Examiner* — Kevin C Harper
*Assistant Examiner* — Sai-Ming Chan
(74) *Attorney, Agent, or Firm* — Krieger Intellectual Property, Inc.; Scott C. Krieger

(57) ABSTRACT

Embodiments of the present invention comprise systems and methods for network connection setup and bandwidth allocation comprising negotiable and non-negotiable modulation allocation procedures.

16 Claims, 5 Drawing Sheets

U.S. PATENT DOCUMENTS

| | | | |
|---|---|---|---|
| 6,278,883 B1 | 8/2001 | Choi | |
| 6,400,819 B1 | 6/2002 | Nakano et al. | |
| 6,408,033 B1 | 6/2002 | Chow et al. | |
| 6,445,707 B1* | 9/2002 | Iuoras et al. | 370/395.43 |
| 6,480,506 B1 | 11/2002 | Gubbi et al. | |
| 6,618,366 B1 | 9/2003 | Furukawa et al. | |
| 6,668,175 B1* | 12/2003 | Almgren et al. | 455/522 |
| 6,674,750 B1 | 1/2004 | Castellano | |
| 6,700,875 B1 | 3/2004 | Schroeder et al. | |
| 6,718,393 B1 | 4/2004 | Aditya | |
| 6,741,554 B2 | 5/2004 | D'Amico et al. | |
| 6,754,176 B1 | 6/2004 | Gubbi et al. | |
| 6,763,384 B1 | 7/2004 | Gupta | |
| 6,795,418 B2 | 9/2004 | Choi | |
| 6,826,186 B1 | 11/2004 | Ditta et al. | |
| 6,850,981 B1 | 2/2005 | Ho et al. | |
| 6,865,609 B1 | 3/2005 | Gibbi et al. | |
| 6,877,043 B2 | 4/2005 | Mallory et al. | |
| 6,891,841 B2 | 5/2005 | Leatherbury et al. | |
| 6,934,554 B2 | 8/2005 | Mizuno et al. | |
| 6,934,752 B1 | 8/2005 | Gubbi | |
| 6,947,748 B2 | 9/2005 | Li et al. | |
| 7,050,452 B2 | 5/2006 | Sugar et al. | |
| 7,072,315 B1 | 7/2006 | Hui et al. | |
| 7,076,220 B2 | 7/2006 | Backes et al. | |
| 7,110,366 B2 | 9/2006 | Hulyalkar et al. | |
| 7,110,380 B2 | 9/2006 | Shvodian | |
| 7,151,558 B1 | 12/2006 | Kogane | |
| 7,180,884 B2 | 2/2007 | Elliott | |
| 7,233,991 B2 | 6/2007 | Adhikari | |
| 7,269,185 B2* | 9/2007 | Kirkby et al. | 370/469 |
| 7,295,518 B1 | 11/2007 | Monk et al. | |
| 7,298,289 B1 | 11/2007 | Hoffberg | |
| 7,315,573 B2 | 1/2008 | Lusky et al. | |
| 7,561,539 B2 | 7/2009 | Sugaya | |
| 2001/0037412 A1* | 11/2001 | Miloushev et al. | 709/315 |
| 2002/0022483 A1 | 2/2002 | Thompson et al. | |
| 2002/0062472 A1 | 5/2002 | Medlock et al. | |
| 2002/0094011 A1* | 7/2002 | Okumura et al. | 375/130 |
| 2002/0133589 A1 | 9/2002 | Gubbi et al. | |
| 2002/0137467 A1 | 9/2002 | Tzannes | |
| 2002/0159418 A1 | 10/2002 | Rudnick et al. | |
| 2002/0163928 A1 | 11/2002 | Rudnick et al. | |
| 2003/0002529 A1 | 1/2003 | Kurdzinski et al. | |
| 2003/0012166 A1 | 1/2003 | Benveniste | |
| 2003/0012167 A1 | 1/2003 | Benveniste | |
| 2003/0012176 A1 | 1/2003 | Kondylis et al. | |
| 2003/0016732 A1 | 1/2003 | Miklos et al. | |
| 2003/0040319 A1 | 2/2003 | Hansen et al. | |
| 2003/0067892 A1 | 4/2003 | Beyer et al. | |
| 2003/0081603 A1 | 5/2003 | Rune | |
| 2003/0084283 A1 | 5/2003 | Pixton | |
| 2003/0126536 A1 | 7/2003 | Gollamudi et al. | |
| 2003/0147368 A1 | 8/2003 | Eitan et al. | |
| 2003/0161268 A1 | 8/2003 | Larsson et al. | |
| 2003/0161340 A1 | 8/2003 | Sherman | |
| 2003/0169697 A1 | 9/2003 | Suzuki | |
| 2003/0174665 A1 | 9/2003 | Benveniste | |
| 2003/0181165 A1 | 9/2003 | Sugar et al. | |
| 2003/0199279 A1 | 10/2003 | Roberts | |
| 2003/0224787 A1 | 12/2003 | Gandolfo | |
| 2003/0231621 A1 | 12/2003 | Gubbi et al. | |
| 2003/0231715 A1 | 12/2003 | Shoemake et al. | |
| 2004/0001429 A1* | 1/2004 | Ma et al. | 370/210 |
| 2004/0013102 A1* | 1/2004 | Fong et al. | 370/345 |
| 2004/0013135 A1 | 1/2004 | Haddad | |
| 2004/0022181 A1 | 2/2004 | Coffey | |
| 2004/0053621 A1 | 3/2004 | Sugaya | |
| 2004/0058686 A1 | 3/2004 | Odman | |
| 2004/0062229 A1* | 4/2004 | Ayyagari et al. | 370/351 |
| 2004/0066738 A1 | 4/2004 | Stopler | |
| 2004/0100897 A1 | 5/2004 | Shattil | |
| 2004/0125786 A1 | 7/2004 | Fuchs | |
| 2004/0136393 A1 | 7/2004 | Riveiro Insua et al. | |
| 2004/0166869 A1 | 8/2004 | Laroia et al. | |
| 2004/0184398 A1 | 9/2004 | Walton et al. | |
| 2004/0224634 A1 | 11/2004 | Kim | |
| 2004/0224676 A1 | 11/2004 | Iseki | |
| 2005/0030890 A1 | 2/2005 | Benco et al. | |
| 2005/0030967 A1 | 2/2005 | Ohmi | |
| 2005/0192037 A1 | 9/2005 | Nanda et al. | |
| 2006/0039275 A1 | 2/2006 | Walton et al. | |
| 2006/0114826 A1 | 6/2006 | Brommer | |
| 2006/0227706 A1 | 10/2006 | Burst, Jr. | |
| 2006/0250973 A1 | 11/2006 | Trott | |
| 2006/0251098 A1 | 11/2006 | Morioka | |
| 2007/0211786 A1 | 9/2007 | Shattil | |
| 2008/0039148 A1 | 2/2008 | Rudolf | |

FOREIGN PATENT DOCUMENTS

| | | |
|---|---|---|
| JP | 11-205352 | 7/1999 |
| JP | 2000-165930 | 6/2000 |
| JP | 2004-503181 | 1/2002 |
| JP | 2004-537875 | 6/2002 |
| JP | 2003-110571 | 4/2003 |
| JP | 2003-249936 | 9/2003 |
| WO | WO00/74322 | 12/2000 |
| WO | WO02/41586 | 5/2002 |

OTHER PUBLICATIONS

International Application No. PCT/US04/036797 International Preliminary Examination Report.
International Application No. PCT/US04/036798 International Search Report.
International Application No. PCT/US04/036799 International Preliminary Examination Report.
International Application No. PCT/US04/036799 International Search Report.
International Application No. PCT/US04/036786 International Preliminary Examination Report.
International Application No. PCT/US04/036786 International Search Report.
International Application No. PCT/US04/036796 International Preliminary Examination Report.
International Application No. PCT/US04/036796 International Search Report.
International Application No. PCT/US04/036969 International Preliminary Examination Report.
International Application No. PCT/US04/036969 International Search Report.
International Application No. PCT/US04/036785 International Preliminary Examination Report.
International Application No. PCT/US04/036785 International Search Report A.
International Application No. PCT/US04/036785 International Search Report B.
U.S. Appl. No. 11/089,882—Office Action dated May 21, 2008.
U.S. Appl. No. 11/089,792—Office Action dated Feb. 21, 2006.
U.S. Appl. No. 11/089,792—Office Action dated Mar. 28, 2006.
U.S. Appl. No. 11/089,792—Office Action dated Nov. 6, 2006.
U.S. Appl. No. 11/089,792—Office Action dated Apr. 25, 2007.
U.S. Appl. No. 11/089,792—Office Action dated Aug. 8, 2007.
U.S. Appl. No. 11/090,549—Office Action dated Dec. 12, 2007.
U.S. Appl. No. 11/089,756—Office Action dated Sep. 10, 2009.
U.S. Appl. No. 11/089,759—Notice of Allowance dated Oct. 8, 2009.
U.S. Appl. No. 11/089,792—Notice of Allowance dated Jan. 28, 2008.
U.S. Appl. No. 11/090,549—Office Action dated Dec. 30, 2009.
U.S. Appl. No. 11/090,549 Office Action dated Jul. 7, 2009.
U.S. Appl. No. 11/089,882 Office Action dated Oct. 8, 2009.
European Search Report for PCT/US 2004036785 corresponding to U.S. Appl. No. 11/089,629 which has technical similarities to the present application.
Japanese Office Action JP 2006-538485 corresponding to U.S. Appl. No. 11/090,549 which has technical similarities to the present application.
U.S. Appl. No. 11/089,629 Office Action dated Jul. 23, 2008.
U.S. Appl. No. 11/089,629 Office Action dated Jan. 16, 2009.
U.S. Appl. No. 11/089,759 Office Action dated Aug. 4, 2008.
U.S. Appl. No. 11/089,759 Office Action dated Jan. 26, 2009.
U.S. Appl. No. 11/089,882 Office Action dated Feb. 24, 2009.

U.S. Appl. No. 11/089,756 Office Action dated Jul. 21, 2008.
U.S. Appl. No. 11/089,756 Office Action dated Dec. 24, 2008.
U.S. Appl. No. 11/090,549 Office Action dated Jul. 10, 2008.
U.S. Appl. No. 11/090,549 Office Action dated Jan. 5, 2009.
International Application No. PCT/US04/036798 International Preliminary Examination Report (Previously cited incorrectly in the Information Disclosure Statement dated Jun. 2, 2008.).
European Search Report for PCT/US 2004036797 corresponding to U.S. Appl. No. 11/089,882 which has technical similarities to the present application.
Japanese Office Action JP2007-503890 corresponding to U.S. Appl. No. 11/089,759 which has technical similarities to the present application.
Japanese Office Action JP2007-527184 corresponding to U.S. Appl. No. 11/089,756 which has technical similarities to the present application.
Japanese Office Action JP2006-538487 corresponding to U.S. Appl. No. 11/089,792 which has technical similarities to the present application.
Decision of Rejection for JP2006-538487 corresponding to U.S. Appl. No. 11/089,792 which has technical similarities to the present application.
U.S. Appl. No. 11/089,756—Notice of Allowance dated May 27, 2010.

* cited by examiner

SYSTEMS AND METHODS FOR NETWORK CHANNEL ALLOCATION

CROSS-REFERENCE TO RELATED APPLICATIONS

This application is a continuation of International Patent Application No. PCT/US2004/36969 filed on Nov. 5, 2004 which claims the benefit of U.S. Provisional Patent Applications: No. 60/518,036 filed Nov. 7, 2003 entitled "OFDMA (FDM+TDM) Schedulers for OFDM PHY's"; No. 60/518, 036 60/518,224 filed Nov. 7, 2003 entitled "Reconfiguration of Sub-Channels in an OFDM System"; No. 60/518,237 filed Nov. 7, 2003 entitled "Network Bandwidth Optimization For Channel Estimation Measurements"; No. 60/518,574 filed Nov. 7, 2003 entitled "Selection Of Fixed Versus Dynamic Modulation Settings In An OFDM System"; No. 60/537,492 filed Jan. 19, 2004 entitled "Resource Coordination Architecture For Neighboring Networks"; and No. 60/573,353 filed May 21, 2004 entitled "System Design Document For Neighbor Network Operations."

BACKGROUND OF THE INVENTION

In communications systems, such as those that allow orthogonal frequency division multiplexing (OFDM), the modulation used on the physical channel may be selected based on the measured characteristics of the physical communication channel. The processes involved with the selection of the channel modulation consume resources such as network bandwidth and time. When the processes for selecting the channel modulation are in series with a connection setup request, the modulation selection processes may cause additional delay in establishing the connection. Users requesting a new connection may be very sensitive to connection setup delay and may benefit from minimization of these delays.

Some known networking systems use procedures to select the channel modulation at the beginning of each connection setup. These procedures generally involve measuring the channel characteristics and selecting the best modulation given those measurements. In some known systems, if channel measurements have been recently made (e.g. a similar connection has been recently established), the measurement and modulation selection procedures may be shortened by omitting another channel measurement process.

BRIEF SUMMARY OF THE INVENTION

Embodiments of the present invention comprise systems and methods for network connection setup and bandwidth allocation including negotiable and non-negotiable modulation allocation procedures.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF SOME EXEMPLARY EMBODIMENTS

Figure 1:
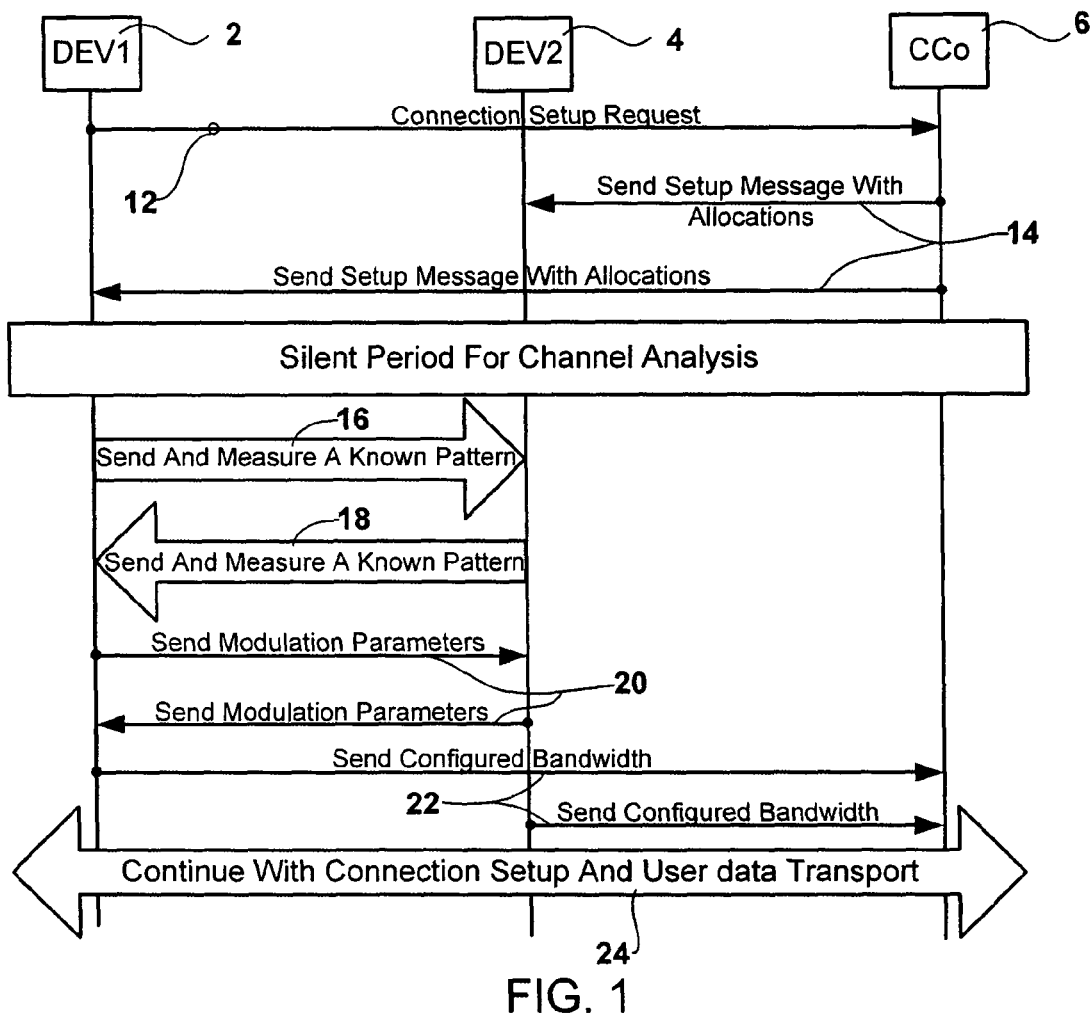
FIG. 1 is a diagram showing a connection setup procedure with negotiable modulation.

In some embodiments of the present invention, a central coordinator (CCo) may decide to forgo the channel measurement and modulation negotiation procedures for connections whose quality of service (QoS) requirements call for a short connection setup time and when the state of the network is such that a reduced connection setup time can be traded off against increased network inefficiencies.

A central coordinator (CCo) may comprise a distinct device connected to a network for the purpose of managing network connections and settings. A CCo may also comprise part of another network device, such as a computing device, that performs many functions including, but not limited to, network connection and network parameter management.

Embodiments of the present invention may be implemented as hardware, firmware, software or combinations thereof. These embodiments may be implemented as a single unit or as multiple units or portions of one or more units.

Embodiments of the present invention may be implemented in a variety of network systems, including, but not limited to, powerline networks, wireless networks, wired networks and others. Specific embodiments may be implemented in the Avalanche network protocol described in the Avalanche specification: *Power Line Communications (PLC) AV, Avalanche Protocol Specification; Version* 0.4.1, Oct. 8, 2003, which is hereby incorporated herein by reference.

In communications systems in which the modulation of one or more physical channels is configured at the time a communication channel is established, embodiments of the present invention may allow the modulation selection procedures to be reduced such that a lesser amount of time is used to select and communicate the settings to the devices at either end of the communication link. The modulation selected for the communication channel may be sub-optimal for network utilization, but this trade-off can be beneficial and even preferred when the state of the network is such that users are more sensitive to connection setup latencies than data throughput.

Additionally, in some embodiments, a network may have excess network bandwidth available that may be utilized for reduced connection setup latency in which case additional network bandwidth may be consumed in trade for minimum connection setup time and increased network inefficiency. The decision to use fixed modulation settings (non-negotiable) or dynamic settings (negotiable) may be made by a CCo based on the QoS requirements specified for the connection.

In some embodiments of the present invention, modulation selection procedures may consider the QoS requirements of a new connection and the QoS requirements of other active connections on the network. The modulation selection process may inspect the QoS requirements of the new connection request. If the user is sensitive to connection setup delay, the procedure may over-allocate bandwidth (as practical) to the connection and configure the modulation to a conservative modulation type that will meet the other performance characteristics of the connection, such as the required maximum error rate.

In some embodiments, the modulation selection procedures may consider the current state of the network including, but not limited to, allocations and excess bandwidth. The modulation selection process may check the current and expected network utilization and use this information to modify connection setup and bandwidth allocation. If a significant amount of excess network bandwidth exists, the modulation selection procedures may opt for a quick connection setup time at the expense of network utilization efficiency.

In some exemplary embodiments of the present invention, the inventive procedures for setting up physical channels may be used. These embodiments may be explained with reference to FIG. 1. In these embodiments a negotiable modulation scheme may be used wherein a device 2 makes a connection setup request 12 to the CCo 6. The CCo 6 then decides, with knowledge of the current state of the network and the QoS requirements or delay sensitivity of the requested connection that the modulation settings on the allocated tones may be negotiated between the two devices, Dev1 2 and Dev2 4.

A CCo may base decisions on a fixed and known set of modulation parameters that typically define a lowest level of connection performance. Additionally or alternatively, a CCo may collect and maintain an up-to-date database of modulation parameters applicable to connections in the network.

The CCo 6 may then send a setup message 14 to the two devices 2 & 4. This message may specify the parameters to perform channel analysis, and the allocations (tones and timeslots) for the new connection.

When the two devices 2 & 4 receive the message, they will perform channel analysis to determine the optimal modulation type to be used on the new connection. First, both devices measure performance on the tones for a period of time specified by channel analysis parameters to measure the noise floor. Next, the source device sends a known pattern on the tones for a period of time while the destination device makes measurements 16. The destination device may then transmit a known pattern while the source device makes measurements 18.

After the measurements are made, the two devices 2 & 4 may exchange the results with a pair of messages 20. These messages may specify the modulation type for each tone that the devices should use in the future. The two devices 2 & 4 may then send a confirming message 22 to the CCo 6 to report the bandwidth observed on the new connection based on the modulation type determined by channel analysis between the two devices 2 & 4. The two devices 2 & 4 may then continue with Connection setup 24.

Figure 2:
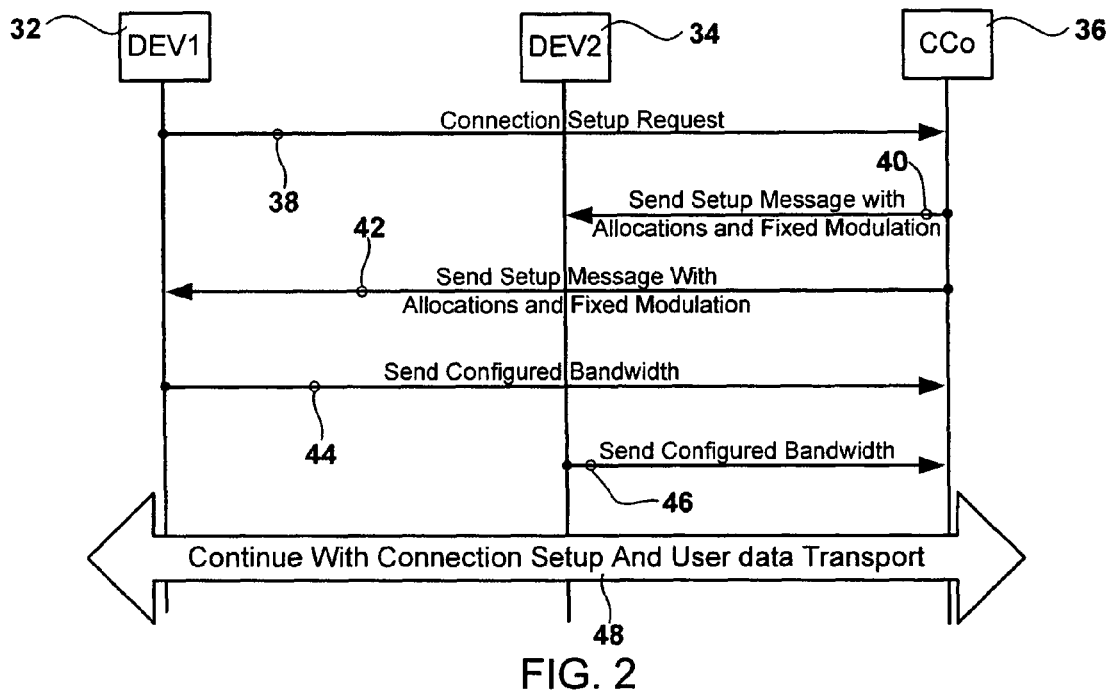
FIG. 2 is a diagram showing a connection setup procedure without negotiable modulation.

In some embodiments of the present invention a connection setup scheme may be used that does not involve inter-device negotiation. These embodiments may be described with reference to FIG. 2. In these embodiments, a device 32 makes a connection setup request 38 to the CCo 36. The CCo 36 then decides, with knowledge of the current state of the network and the QoS requirements of the requested connection, that the modulation settings on the allocated tones are not to be negotiated between the two devices, Dev1 32 and Dev2 34. The CCo 36 sets the modulation on each tone.

The CCo 36 may send setup messages 40 & 42 to the two devices 32 & 34. These messages may specify the allocation with fixed modulation type for the new connection. When the two devices 32 & 34 receive the messages 40 & 42, they may reply 44 & 46 to the CCo 36 acknowledging the connection's configuration. These messages 44 & 46 may include a report of the bandwidth observed on the connection based on the specified modulation type. The two devices 32 & 34 may then continue with connection setup 48.

Figure 3:
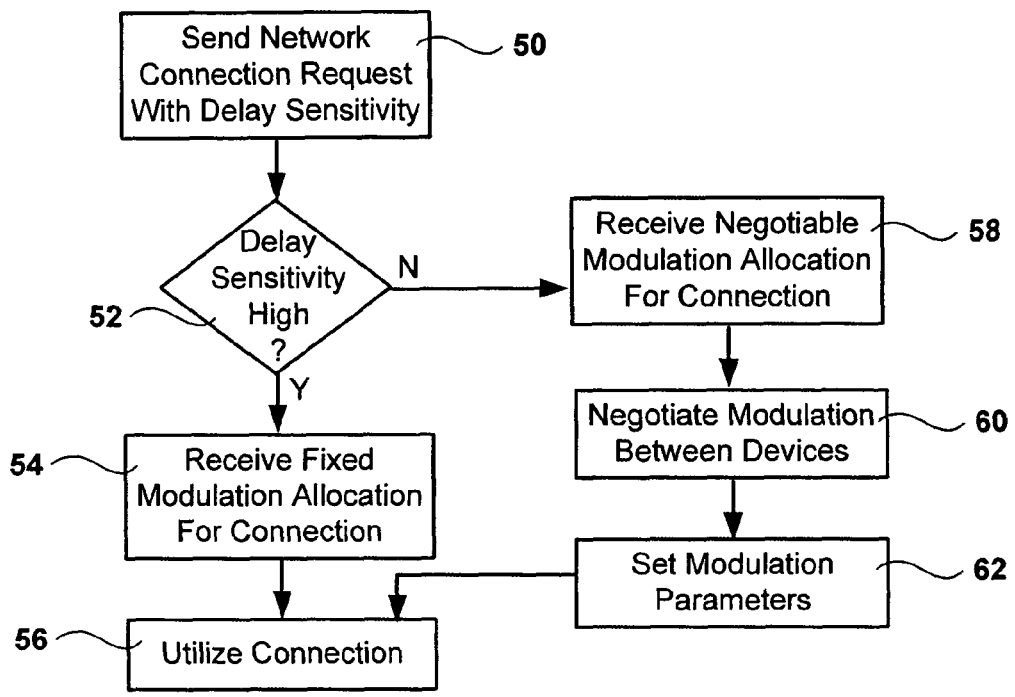
FIG. 3 is a chart showing embodiments comprising a device connection request method.

Some embodiments of the present invention may be described with reference to FIG. 3. In these embodiments, a device sends 50 a network connection request in connection with an indication of the sensitivity of the connection to delay. The delay sensitivity of the connection request is evaluated 52 to determine whether a delay caused by negotiating a connection will adversely affect the connection. If the sensitivity is high, a fixed modulation allocation will be assigned and received 54 by the requesting device. Once the fixed allocation has been assigned, the connection may be utilized 56.

If the sensitivity is low and a connection delay can be tolerated, a negotiable modulation allocation may be assigned and received 58. The device may then negotiate modulation settings 60 with the connected device. Once measurement, testing and negotiation are complete, modulation parameters may be set 62 and the connection may be utilized 56.

Figure 4:
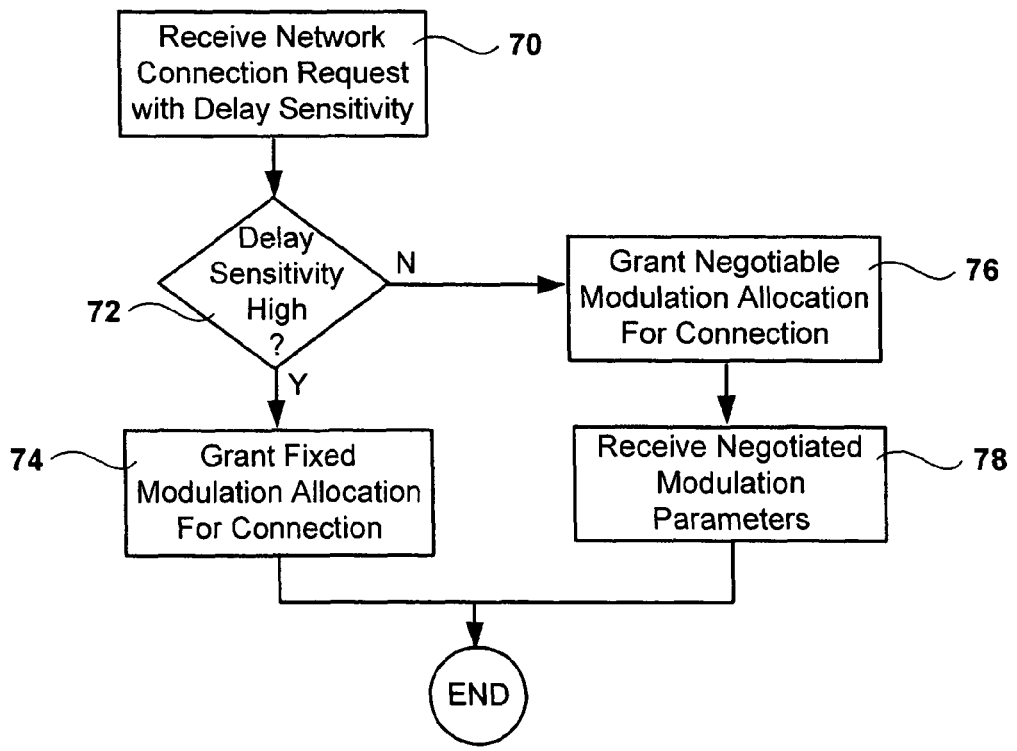
FIG. 4 is a chart showing embodiments comprising a central coordinator.

Some embodiments of the present invention may be described with reference to FIG. 4. In these embodiments, a network managing authority, such as a CCo, may receive 70 a network connection request. In conjunction with this request, an indication of the sensitivity of the connection to delay will be indicated. This delay sensitivity is then evaluated to determine whether any delay caused by connection negotiation can be tolerated. If the sensitivity is high and delay cannot be tolerated or will have some adverse impact on the connection, the managing authority may grant 74 a fixed modulation allocation for the connection. The requesting device or devices may then use the connection without further negotiation delay.

If the sensitivity to initial delay is low, the managing authority may grant 76 a negotiable modulation allocation for the connection. The device participating in the connection may then negotiate the modulation parameters to be used for the connection. This negotiation may comprise measurement and testing. Once the modulation parameters have been negotiated by the device, they may be transmitted to and received 78 by the managing authority, which may then record the negotiated allocation to avoid conflicts.

Figure 5:
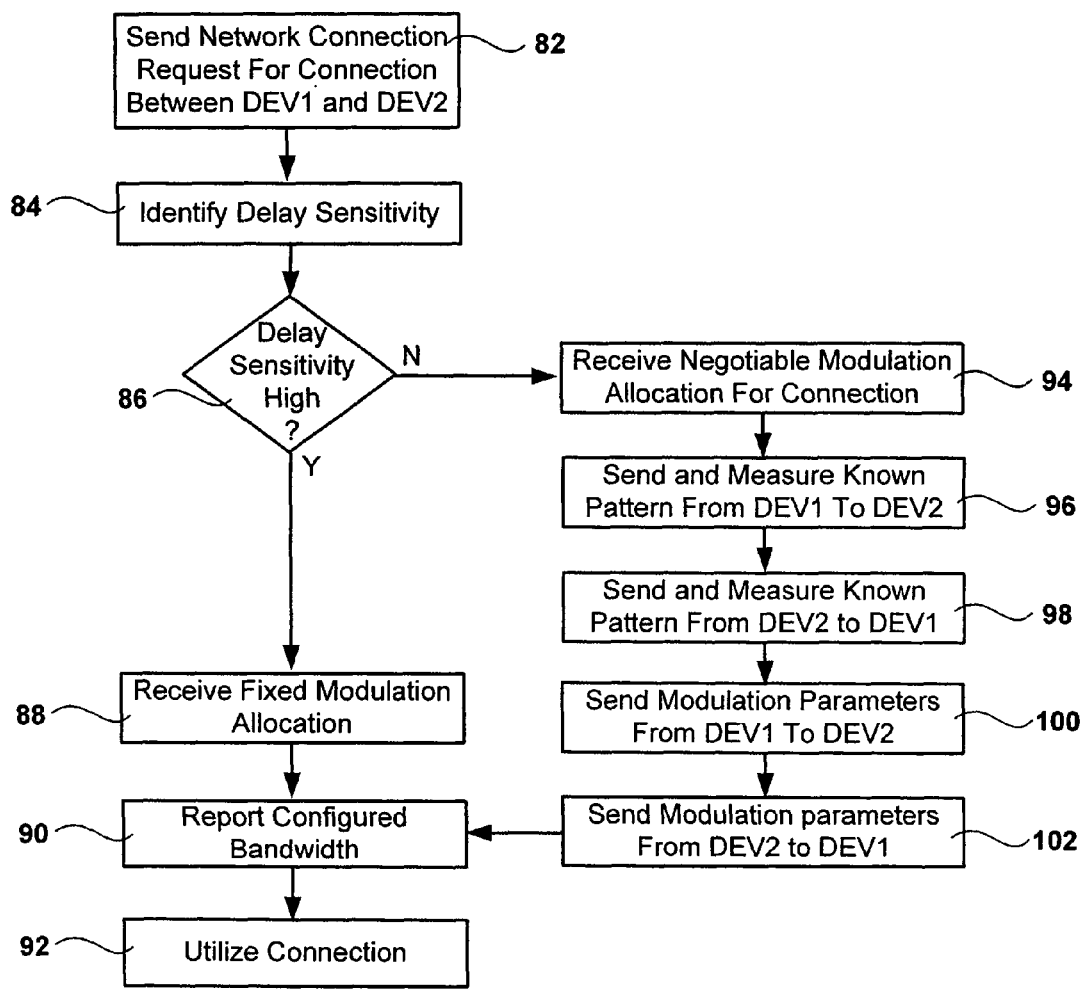
FIG. 5 is a chart showing embodiments comprising a device connection request method wherein known patterns are sent and measured to negotiate connection parameters.

Some embodiments of the present invention may be described with reference to FIG. 5. In these embodiments, a network device, Dev1, may send a network connection request 82 for a connection between that device, Dev1 and a connecting device, Dev2. The requesting device, Dev1, will also identify the delay sensitivity of the connection. This sensitivity may be in the form of a QoS factor. A managing authority, such as a CCo, may then evaluate the delay sensitivity 86 to determine whether connection negotiation will benefit the connection. If negotiation will not benefit the connection, a fixed modulation allocation may be assigned and received 88 by the requesting device and any connecting devices. These devices may then report 90 the bandwidth of the connection and utilize 92 the connection.

If the negotiation may benefit the connection, a negotiable modulation allocation may be assigned and received 94 by the requesting device, Dev1. The requesting device may then send and measure a known pattern 96 from Dev1 to a connecting device, Dev2. The connecting device, Dev2, may also send and measure a known pattern 98 from Dev2 to Dev1. Modulation parameters may also be sent 100 from Dev1 to Dev2. Modulation parameters may also be sent 102 from Dev2 to Dev1. Bandwidth obtained over the connection may then be reported 90 and the connection may be utilized 92.

Figure 6:
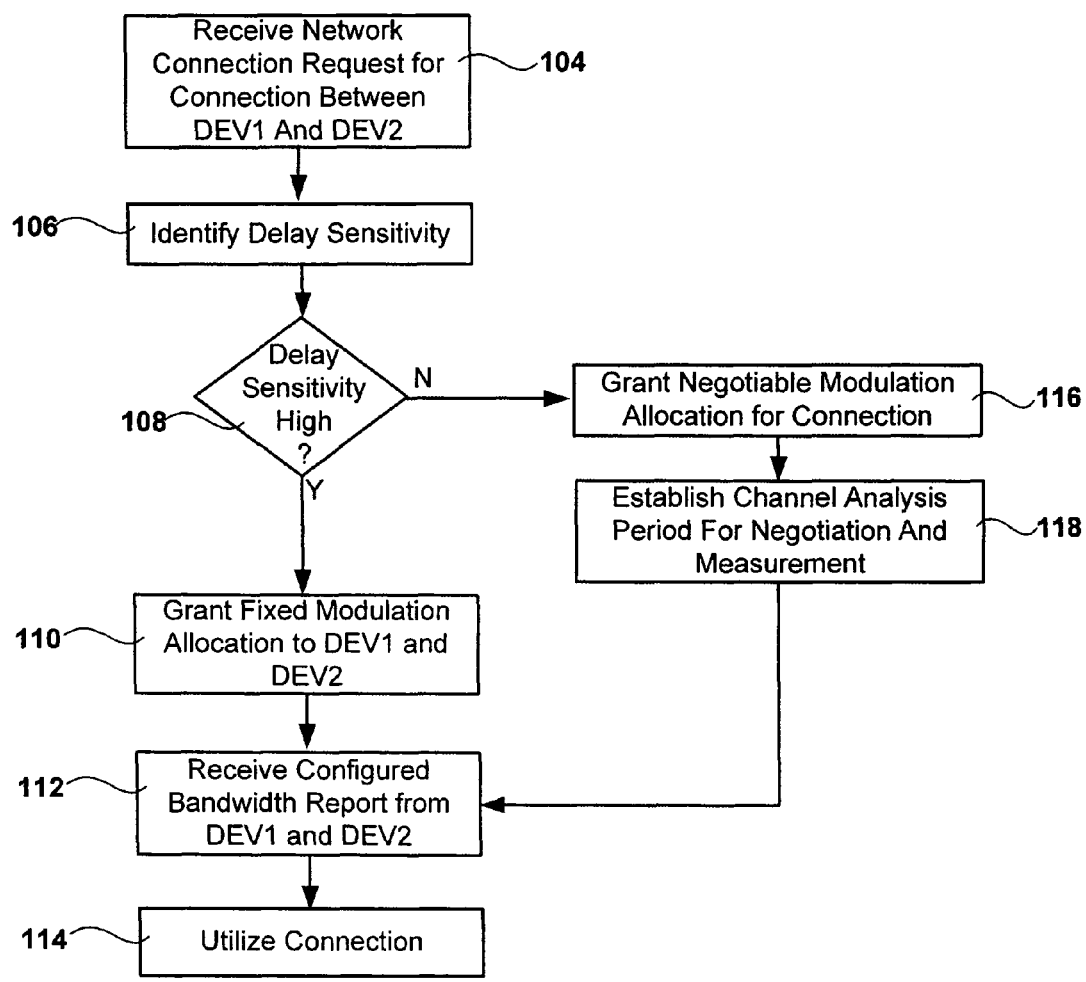
FIG. 6 is a chart showing embodiments comprising a central coordinator method wherein known patterns are sent and measured to negotiate connection parameters.

Some embodiments of the present invention may be described with reference to FIG. 6. In these embodiments, a network connection request may be received 104 by a managing authority. This request is received from one or more devices, such as Dev1 and Dev2. A delay sensitivity, such as a QoS level, may also be sent 106 to identify whether negotiation delay will be tolerated. If negotiation of the connection by the devices will not benefit the connection, a fixed modulation allocation will be granted 110 to the connecting devices, Dev1 and Dev2. Once the allocation is granted, the connected devices may then report the connection bandwidth to the managing authority, who receives 112 the report. The connection may then be utilized 114.

If the connection will benefit from connection negotiation, a negotiable modulation allocation may be granted 116 for the connection. The managing authority may also establish 118 a channel analysis period during which the connecting device may measure connection performance. Once the parameters have been measured and negotiated, the devices may report the connection bandwidth to the managing authority, who receives the report 112. The connection may then be utilized 114 by the devices.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

We claim:

1. A method for establishing a network connection, said method comprising:
   a) receiving a request for a network connection at a network central coordinator device (CCo), wherein said CCo allocates network bandwidth to network devices and said request is received from a network device seeking a bandwidth allocation;
   b) receiving an indication of said connection's sensitivity to connection negotiation delay at said CCo;
   c) assigning a negotiable modulation allocation to said network device when said sensitivity to network connection negotiation delay is not significant, wherein said assigning is performed by said CCo comprising a processor and a memory; and
   d) assigning a fixed modulation allocation, with said CCo, when said sensitivity to network connection negotiation delay is significant.

2. A method as described in claim 1 wherein said indication of said connection's sensitivity to connection negotiation delay is a QoS parameter.

3. A method as described in claim 1 wherein said indication of said connection's sensitivity to connection negotiation delay is determined by the type of device requesting said network connection.

4. A method for establishing a network connection, said method comprising:
   a) initiating a request for a network connection by sending a connection request from a network device to a network central coordinator (CCo), wherein said CCo allocates network bandwidth to network devices;
   b) sending an indication of said network connection's sensitivity to connection negotiation delay, wherein said sending is performed by a said network device comprising a processor and a memory;
   c) receiving a negotiable modulation allocation, at said network device from said CCo, when said sensitivity to network connection negotiation delay is not significant; and
   d) receiving a fixed modulation allocation from said CCo, at said network device, when said sensitivity to network connection negotiation delay is significant.

5. A method as described in claim 4 wherein said indication of said connection's sensitivity to connection negotiation delay is a QoS parameter.

6. A method as described in claim 4 wherein said indication of said connection's sensitivity to connection negotiation delay is determined by the type of device requesting said network connection.

7. A method for establishing a network connection, said method comprising:
   a) receiving a request for a network connection, at a network bandwidth allocation device comprising a processor and a memory, said request being received from a network device,
   b) granting a negotiable modulation allocation to said network device, with said network bandwidth allocation device, when said connection will not be adversely impacted by connection modulation negotiation; and
   c) granting a fixed modulation allocation, with said network bandwidth allocation device, when said connection will be adversely impacted by connection modulation negotiation.

8. A method as described in claim 7 further comprising establishing a channel analysis period.

9. A method as described in claim 7 further comprising receiving a configured bandwidth report.

10. A method for establishing a network connection, said method comprising:
    a) sending a request for a network connection from a network device comprising a processor and a memory to a network coordinator (CCo), wherein said CCo allocates network bandwidth to network devices,
    b) receiving a negotiable modulation allocation from said CCo at said network device, when said connection will not be adversely impacted by connection modulation negotiation; and
    c) receiving a fixed modulation allocation from said CCo at said network device, when said connection will be adversely impacted by connection modulation negotiation.

11. A method as described in claim 10 further comprising sending a configured bandwidth report.

12. A method as described in claim 10 further comprising negotiating connection modulation parameters.

13. A method as described in claim 10 further comprising sending and measuring a known pattern between network devices.

14. A method as described in claim 10 further comprising sending modulation parameters between network devices.

15. An apparatus for establishing a network connection, said apparatus comprising:
    a) a receiver for receiving a request for a network connection from a network device; and
    b) a connection manager for granting network connection allocations to network devices, wherein a negotiable modulation allocation is granted when said connection will not be adversely impacted by connection modulation negotiation; and c) wherein a fixed modulation allocation is granted when said connection will be adversely impacted by connection modulation negotiation.

16. An apparatus for establishing a network connection, said apparatus comprising:

a) a requester for requesting a network connection from a network central coordinator (CCo), wherein said CCo allocates network bandwidth to network devices, b) an indicator for indicating a sensitivity to connection negotiation delay;

c) a negotiator for negotiating connection modulation parameters with said CCo when said sensitivity to connection negotiation delay is low; and d) a receiver for receiving a network connection allocation from said CCo, wherein said receiver receives a fixed network allocation when said sensitivity to connection negotiation delay is high.

* * * * *